(12) United States Patent
Arunachalam et al.

(10) Patent No.: US 10,326,817 B2
(45) Date of Patent: Jun. 18, 2019

(54) SYSTEM AND METHOD FOR QUALITY-AWARE RECORDING IN LARGE SCALE COLLABORATE CLOUDS

(71) Applicant: Cisco Technology, Inc., San Jose, CA (US)

(72) Inventors: Chidambaram Arunachalam, Cary, NC (US); Gonzalo Salgueiro, Raleigh, NC (US); Ram Mohan Ravindranath, Bangalore (IN); Nagendra Kumar Nainar, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 196 days.

(21) Appl. No.: 15/385,461

(22) Filed: Dec. 20, 2016

(65) Prior Publication Data
US 2018/0176281 A1 Jun. 21, 2018

(51) Int. Cl.
*G06F 9/38* (2018.01)
*H04L 29/06* (2006.01)
(Continued)

(52) U.S. Cl.
CPC .......... *H04L 65/80* (2013.01); *H04L 43/0829* (2013.01); *H04L 47/2416* (2013.01); *H04L 47/2441* (2013.01); *H04L 49/206* (2013.01); *H04L 65/1006* (2013.01); *H04L 65/1063* (2013.01); *H04L 65/1076* (2013.01); *H04L 65/1086* (2013.01); *H04L 65/4007* (2013.01);
(Continued)

(58) Field of Classification Search
None
See application file for complete search history.

(56) References Cited

U.S. PATENT DOCUMENTS 5,812,773 A 9/1998 Norin
5,889,896 A 3/1999 Meshinsky et al.
(Continued)

FOREIGN PATENT DOCUMENTS

CN 101719930 6/2010
CN 101394360 7/2011
(Continued)

OTHER PUBLICATIONS

Amedro, Brian, et al., "An Efficient Framework for Running Applications on Clusters, Grids and Cloud," 2010, 17 pages.
(Continued)

*Primary Examiner* — Brandon M Renner
(74) *Attorney, Agent, or Firm* — Polsinelli PC

(57) ABSTRACT

An example method includes establishing a communication session between a first participant and a second participant, programming, via a control plane, a stream classifier which is to process packets associated with the communication session with classification logic. The method includes receiving a first packet at the stream classifier and, when the communication session requires recording, applying the classification logic at the stream classifier to route the first packet into a chosen service function path that includes a recording service function which reports media quality data to the control plane. Based on the media quality data, the classification logic is updated to cause a migration of the communication session to a new chosen service function path.

20 Claims, 5 Drawing Sheets

(51) Int. Cl.
*H04L 12/26* (2006.01)
*H04L 12/851* (2013.01)
*H04L 29/08* (2006.01)
*H04L 12/931* (2013.01)
*H04L 12/853* (2013.01)
*H04M 3/51* (2006.01)
*H04M 3/42* (2006.01)

(52) U.S. Cl.
CPC ............ *H04L 67/10* (2013.01); *H04L 67/327* (2013.01); *H04L 69/22* (2013.01); *H04M 3/42221* (2013.01); *H04M 3/5141* (2013.01); *H04M 3/5183* (2013.01)

(56) References Cited

U.S. PATENT DOCUMENTS

| | | |
|---|---|---|
| 6,108,782 A | 8/2000 | Fletcher et al. |
| 6,178,453 B1 | 1/2001 | Mattaway et al. |
| 6,298,153 B1 | 10/2001 | Oishi |
| 6,343,290 B1 | 1/2002 | Cossins et al. |
| 6,587,463 B1* | 7/2003 | Hebb ............... H04L 47/10 370/392 |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,885,670 B1 | 4/2005 | Regula |
| 6,996,615 B1 | 2/2006 | McGuire |
| 7,054,930 B1 | 5/2006 | Cheriton |
| 7,058,706 B1 | 6/2006 | Iyer et al. |
| 7,062,571 B1 | 6/2006 | Dale et al. |
| 7,076,397 B2 | 7/2006 | Ding et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,606,147 B2 | 10/2009 | Luft et al. |
| 7,647,594 B2 | 1/2010 | Togawa |
| 7,684,322 B2 | 3/2010 | Sand et al. |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,040,801 B2* | 10/2011 | Lin ............... H04L 47/10 370/230 |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,284,776 B2 | 10/2012 | Petersen |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,252 B2 | 7/2013 | Lais et al. |
| 8,495,356 B2 | 7/2013 | Ashok et al. |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andreis et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,182 B1 | 9/2014 | Fritz et al. |
| 8,856,339 B2 | 10/2014 | Mestery et al. |
| 8,909,780 B1 | 12/2014 | Dickinson et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,104,334 B2 | 8/2015 | Madhusudana et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,313,048 B2 | 4/2016 | Chang et al. |
| 9,361,192 B2 | 6/2016 | Smith et al. |
| 9,380,075 B2 | 6/2016 | He et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,613,078 B2 | 4/2017 | Vermeulen et al. |
| 9,628,471 B1 | 4/2017 | Sundaram et al. |
| 9,632,858 B2 | 4/2017 | Sasturkar et al. |
| 9,658,876 B2 | 5/2017 | Chang et al. |
| 9,692,802 B2 | 6/2017 | Bicket et al. |
| 9,727,359 B2 | 8/2017 | Tsirkin |
| 9,736,063 B2 | 8/2017 | Wan et al. |
| 9,755,858 B2 | 9/2017 | Bagepalli et al. |
| 9,792,245 B2 | 10/2017 | Raghavan et al. |
| 9,804,988 B1 | 10/2017 | Ayoub et al. |
| 9,954,783 B1 | 4/2018 | Thirumurthi et al. |
| 2002/0004900 A1 | 1/2002 | Patel |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0012147 A1* | 1/2003 | Buckman ............... H04L 12/14 370/260 |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0095237 A1 | 5/2004 | Chen et al. |
| 2004/0131059 A1 | 7/2004 | Ayyakad et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0059558 A1 | 3/2006 | Selep et al. |
| 2006/0104286 A1 | 5/2006 | Cheriton |

(56) References Cited

U.S. PATENT DOCUMENTS

| | | |
|---|---|---|
| 2006/0120575 A1 | 6/2006 | Ahn et al. |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0294207 A1 | 12/2006 | Barsness et al. |
| 2007/0011330 A1 | 1/2007 | Dinker et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0010277 A1* | 1/2009 | Halbraich ............ H04L 67/125 370/465 |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0217886 A1* | 8/2010 | Seren .................. G06N 99/005 709/231 |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325257 A1 | 12/2010 | Goel et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0199902 A1 | 8/2011 | Leavy et al. |
| 2011/0213687 A1 | 9/2011 | Ferris et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0023418 A1 | 1/2012 | Frields et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0166649 A1 | 6/2012 | Watanabe et al. |
| 2012/0167094 A1 | 6/2012 | Suit |
| 2012/0173541 A1 | 7/2012 | Venkataramani |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185632 A1 | 7/2012 | Lais et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0203908 A1 | 8/2012 | Beaty et al. |
| 2012/0204169 A1 | 8/2012 | Breiter et al. |
| 2012/0204187 A1 | 8/2012 | Breiter et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0069950 A1 | 3/2013 | Adam et al. |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185413 A1 | 7/2013 | Beaty et al. |
| 2013/0185433 A1 | 7/2013 | Zhu et al. |

(56) References Cited

U.S. PATENT DOCUMENTS

| | | |
|---|---|---|
| 2013/0191106 A1 | 7/2013 | Kephart et al. |
| 2013/0198050 A1 | 8/2013 | Shroff et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0232492 A1 | 9/2013 | Wang |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339693 A1* | 12/2013 | Bonanno ............. G06F 9/30047 712/238 |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0019639 A1 | 1/2014 | Ueno |
| 2014/0040473 A1 | 2/2014 | Ho et al. |
| 2014/0040883 A1 | 2/2014 | Tompkins |
| 2014/0052877 A1 | 2/2014 | Mao |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0160924 A1* | 6/2014 | Pfautz ................. H04L 47/2441 370/235 |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0269266 A1 | 9/2014 | Filsfils et al. |
| 2014/0269446 A1 | 9/2014 | Lum et al. |
| 2014/0280805 A1 | 9/2014 | Sawalha |
| 2014/0282536 A1 | 9/2014 | Dave et al. |
| 2014/0282611 A1 | 9/2014 | Campbell et al. |
| 2014/0282669 A1 | 9/2014 | McMillan |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0314078 A1 | 10/2014 | Jilani |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0006470 A1 | 1/2015 | Mohan |
| 2015/0033086 A1 | 1/2015 | Sasturkar et al. |
| 2015/0043335 A1* | 2/2015 | Testicioglu ............. H04L 45/48 370/230 |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0058557 A1 | 2/2015 | Madhusudana et al. |
| 2015/0070516 A1 | 3/2015 | Shoemake et al. |
| 2015/0071285 A1 | 3/2015 | Kumar et al. |
| 2015/0089478 A1 | 3/2015 | Cheluvaraju et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0109923 A1 | 4/2015 | Hwang |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0149828 A1 | 5/2015 | Mukerji et al. |
| 2015/0178133 A1 | 6/2015 | Phelan et al. |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0271199 A1 | 9/2015 | Bradley et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2015/0379062 A1 | 12/2015 | Vermeulen et al. |
| 2016/0011925 A1 | 1/2016 | Kulkarni et al. |
| 2016/0013990 A1 | 1/2016 | Kulkarni et al. |
| 2016/0062786 A1 | 3/2016 | Meng et al. |
| 2016/0065417 A1 | 3/2016 | Sapuram et al. |
| 2016/0094398 A1 | 3/2016 | Choudhury et al. |
| 2016/0094480 A1 | 3/2016 | Kulkarni et al. |
| 2016/0094643 A1 | 3/2016 | Jain et al. |
| 2016/0094894 A1 | 3/2016 | Inayatullah et al. |
| 2016/0099847 A1 | 4/2016 | Melander et al. |
| 2016/0099873 A1 | 4/2016 | Gerö et al. |
| 2016/0103838 A1 | 4/2016 | Sainani et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0147676 A1 | 5/2016 | Cha et al. |
| 2016/0162436 A1 | 6/2016 | Raghavan et al. |
| 2016/0164914 A1 | 6/2016 | Madhav et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0292027 A1* | 10/2016 | Moyer ................. G06F 11/0724 |
| 2016/0292611 A1 | 10/2016 | Boe et al. |
| 2016/0352682 A1 | 12/2016 | Chang |
| 2016/0378389 A1 | 12/2016 | Hrischuk et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0034199 A1 | 2/2017 | Zaw |
| 2017/0041342 A1 | 2/2017 | Efremov et al. |
| 2017/0054659 A1 | 2/2017 | Ergin et al. |
| 2017/0063674 A1 | 3/2017 | Maskalik et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0126583 A1 | 5/2017 | Xia |
| 2017/0147297 A1 | 5/2017 | Krishnamurthy et al. |
| 2017/0163569 A1 | 6/2017 | Koganti |
| 2017/0171158 A1 | 6/2017 | Hoy et al. |
| 2017/0192823 A1 | 7/2017 | Karaje et al. |
| 2017/0264663 A1 | 9/2017 | Bicket et al. |
| 2017/0302521 A1 | 10/2017 | Lui et al. |
| 2017/0310556 A1 | 10/2017 | Knowles et al. |
| 2017/0317932 A1 | 11/2017 | Paramasivam |
| 2017/0339070 A1 | 11/2017 | Chang et al. |
| 2018/0069885 A1 | 3/2018 | Patterson et al. |
| 2018/0173372 A1 | 6/2018 | Greenspan et al. |
| 2018/0174060 A1 | 6/2018 | Velez-Rojas et al. |

FOREIGN PATENT DOCUMENTS

| | | |
|---|---|---|
| CN | 102164091 | 8/2011 |
| CN | 104320342 | 1/2015 |

(56) References Cited

FOREIGN PATENT DOCUMENTS

| | | |
|---|---|---|
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |
| WO | WO 2016/118052 | 7/2016 |

OTHER PUBLICATIONS

Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Kunz, Thomas, et al., "OmniCloud—The Secure and Flexible Use of Cloud Storage Services," 2014, 30 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.

Von Laszewski, Gregor, et al., "Design of a Dynamic Provisioning System for a Federated Cloud and Bare-metal Environment," 2012, 8 pages.
Ye, Xianglong, et al., "A Novel Blocks Placement Strategy for Hadoop," 2012 IEEE/ACTS 11th International Conference on Computer and Information Science, 2012 IEEE, 5 pages.
Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Beyer, Steffen, "Module "Data::Locations?!"," YAPC::Europe, London, UK,ICA, Sep. 22-24, 2000, XP002742700, 15 pages.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.

(56) References Cited

OTHER PUBLICATIONS

Nielsen, "SimMetry Audience Measurement—Technology," http://www.nielsen-admosphere.eu/products-and-services/simmetry-audience-measurement-technology/, accessed Jul. 22, 2015, 6 pages.

Nielsen, "Television," http://www.nielsen.com/us/en/solutions/measurement/television.html, accessed Jul. 22, 2015, 4 pages.

Open Stack, "Filter Scheduler," updated Dec. 17, 2017, 5 pages, accessed on Dec. 18, 2017, https://docs.openstack.org/nova/latest/user/filter-scheduler.html.

Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.

Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.

Shunra, "Shunra for HP Software; Enabling Confidence in Application Performance Before Deployment," 2010, 2 pages.

Son, Jungmin, "Automatic decision system for efficient resource selection and allocation in inter-clouds," Jun. 2013, 35 pages.

Wikipedia, "Filter (software)", Wikipedia, Feb. 8, 2014, 2 pages, https://en.wikipedia.org/w/index.php?title=Filter_%28software%29&oldid=594544359.

Wikipedia; "Pipeline (Unix)", Wikipedia, May 4, 2014, 4 pages, https://en.wikipedia.org/w/index.php?title=Pipeline2/028Unix%29&oldid=606980114.

Extended European Search Report from the European Patent Office, dated Mar. 29, 2018, 9 pages, for the corresponding European Patent Application No. EP 17206917.1.

Al-Harbi, S.H., et al., "Adapting $k$-means for supervised clustering," Jun. 2006, Applied Intelligence, vol. 24, Issue 3, pp. 219-226.

Bohner, Shawn A., "Extending Software Change Impact Analysis into COTS Components," 2003, IEEE, 8 pages.

Hood, C. S., et al., "Automated Proactive Anomaly Detection," 1997, Springer Science and Business Media Dordrecht, pp. 688-699.

Vilalta R., et al., "An efficient approach to external cluster assessment with an application to martian topography," Feb. 2007, 23 pages, Data Mining and Knowledge Discovery 14.1: 1-23. New York: Springer Science & Business Media.

* cited by examiner

SYSTEM AND METHOD FOR QUALITY-AWARE RECORDING IN LARGE SCALE COLLABORATE CLOUDS

TECHNICAL FIELD

The present disclosure relates to recording media and more particularly to enabling quality-aware media recording in a large-scale, multi-tenant, elastic collaboration cloud service operation using a service function chain architecture.

BACKGROUND

Call recording is a key capability in contact center environments. Call recording helps businesses to identify service delivery quality improvement opportunities, comply with legal regulations and promote knowledge reuse for learning/training purposes. Currently, a significant portion of the install base uses on-premise contact center deployments with call recording provided by a dedicated set of Session Initiation Protocol (SIP) based recording servers. As enterprises and small to midsized businesses move towards subscription-based consumption models, service providers are now offering contact center as a service (CCaaS) by hosting multi-tenant, elastic, large-scale Unified Communications (UC) and contact center infrastructure in the cloud. These cloud deployments typically replicate the on-premise architecture and provision several virtual instances of session border controllers (SBCs), and recording servers to support the high call volume in the operator's network. This approach comes with processing inefficiencies such as individual SIP signaling session between Session Recording Client (SRC) and Session Recording Server (SRS) for each recorded session.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
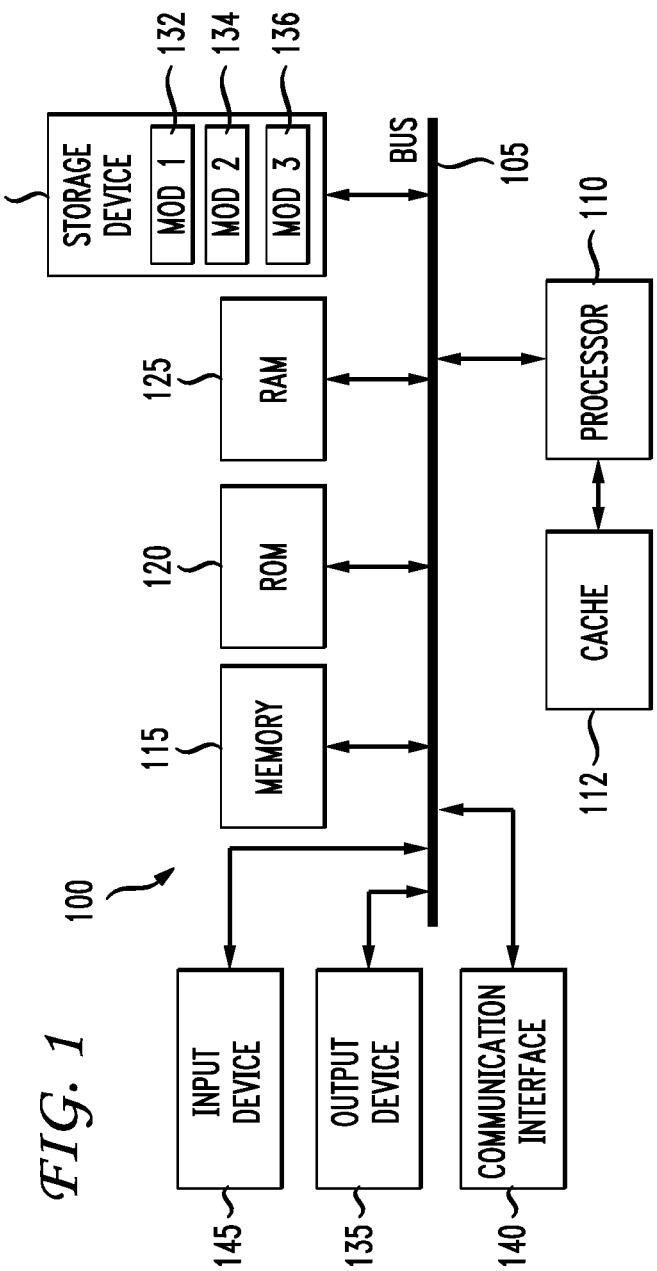
FIG. 1 illustrates an example system configuration.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

There are several issues with the above described contact center as a service (CCaaS) which is hosted by a multi-tenant, elastic, large-scale Unified Communications (UC) and contact center infrastructure in the cloud. The first issue relates to scaling. The current architecture does not enable a plausible approach to scaling the call recording feature in a highly multitenant environment. The second issue relates to quality. Again, the current architecture does not provide a sufficient approach for maintaining good quality. The question is can the system dynamically switch to another service if there is a media quality issue. The architecture needs to be media quality aware. Further, there is an inability to take real-time action to prevent recording media quality degrade.

For example, in today's architecture a network can include a recording server and a separate control server. The SIP protocol can be used to set up the communication paths. In one example, assume a call comes into a company for customer support. The company received a call at a call controlling system. If the company desires to record the call, then a separate call would be established between the call controlling system of the company and the recording server. The SIP protocol would also likely be used to establish the communication (a separate call) between the call controlling system and the recording server. Thus, in the current scenario, the recording function is enabled through this set up of two separate calls between the various entities, the caller, the call controlling system of the company, and a separate recording server.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein. The scheme proposed addresses the issues raised above by leveraging the Service Function Chaining (SFC) Architecture.

Application Ser. No. 14/989,132 (CPOL-998347), filed Jan. 6, 2016, and incorporated herein by reference, is entitled Network Service Header (NSH) Metadata-Based End-to-End Multimedia Session Identification and Multimedia Service Optimization. The '132 application describes the propagation of session-ID value as NSH metadata in the Service Function Chain (SFC) architecture. That disclosure suggests that session-ID metadata can be used to determine inclusion of Session Recording Server (SRS) Service Function (SF) in the Service Function Chain (SFC). The '132 application also proposes reporting of media flow statistics aggregated at the session-ID level. The concepts proposed here build on the foundation of the '132 application by also including a stream ID in the NSH metadata and also goes on to describe the end-to-end procedure used to realize real-time session recording service as a Network Service Function (NSF). The contents of application Ser. No. 14/989,132 are incorporated herein by reference.

In one aspect, an application can provide call recording capabilities. In one approach, the application does not leverage SIP signaling nor SFC to establish recording session. Instead it uses proprietary application APIs to invoke recording to a call, which is not at all an optimal approach to solve this problem for the industry (large clouds, multi-vendor deployments, etc.). The concept disclosed herein leverages and builds on the standards-based SIP Recording (SIPREC) architecture that was defined in the IETF and whose various architectural components are described here: https://datatracker.ietforg/wg/siprec/documents/, incorporated herein by reference. The solution described in this submission makes use of the Service function Chaining (SFC) architecture (defined in RFC 7665) and the metadata field provided by the Network Service Header (NSH) (defined in draft-ietf-sfc-nsh). This disclosure make use of these technologies to deliver a unique and novel solution to deliver real-time and quality-aware session recording for large scale cloud deployments.

This disclosure provides a novel method to enable quality-aware media recording in large scale, multi-tenant, elastic collaboration cloud service operation networks using service function chain architecture. The recording functionality is provided as a service by recording network service function (NSF) using the stream Ii) of the media stream passed as metadata in the network service header (NSH). Recording NSF also reports media statistics to a control plane and a real-time transport protocol (RTP) stream classifier, which is part of a media plane, enabling them to take real-time actions to mitigate or minimize quality impairments in the recorded media. The control plane takes care of connecting callers (from wherever they are calling from) and the call set up. The media plane includes the RTP stream classifier and the network service functions that perform various processing on the media streams in real time, such as recording. The media plane can manage audio, video, media sharing, and so forth. The architecture disclosed herein enables the control plane and the media plane to communicate in such ways as using an API as well as enabling the media plane to be broken up into individual components, logical functions or service functions.

An example method includes establishing a communication session between a first participant and a second participant, programming, via a control plane, an RTP stream classifier which is to process RTP packets associated with the communication session with classification logic. The method includes receiving a first packet at the stream classifier and, when the communication session requires recording, applying the classification logic at the stream classifier to route the first packet into a chosen service function path of a plurality of service function paths, wherein the chosen service function path includes a recording service function. The recording service function can report media quality data to the control plane. Based on the media quality data, the control plane can update the classification logic programmed in the RTP stream classifier to migrate the communication session to a new chosen service function path to yield updated classification logic. The RTP stream classifier then receives subsequent RTP packets of the same session and routes them, according to the updated classification logic, to the new chosen service function path.

Several advantages of the concepts disclosed herein include the ability to eliminate the need to have SIP signaling between the Session Recording Client (SRC) and the Session Recording Server (SRS) and to detect low quality recording conditions and take actions to prevent continued quality degradation. This is useful for environments that require zero or very minimal loss recording for regulatory compliance. While one aspect of the idea applies to applications using that SIP protocol, the concepts disclosed therein are broader and any particular discussion of the concepts disclosed herein should not be presumed to be in the context of SIP unless explicitly stated. Thus, any signaling protocol and/or any recording architecture could apply to the principles disclosed herein.

Further advantages can include enabling storage location flexibility in a multi-tenant environment. The storage location can be different for different tenants and can be dynamically changed by the control plane and increasing scalability by moving recording as a data plane functionality.

DESCRIPTION

The present disclosure addresses the issues raised above. The disclosure provides a system, method and computer-readable storage device embodiments. First a general example system shall be disclosed in FIG. 1 which can provide some basic hardware components making up a server, node or other computer system.

FIG. 1 illustrates a computing system architecture 100 wherein the components of the system are in electrical communication with each other using a bus 105. Exemplary system 100 includes a processing unit (CPU or processor) 110 and a system bus 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware module or software module, such as module 1 132, module 2 134, and module 3 136 stored in storage device 130, configured to control the processor 110 as well as a special-purpose processor where software instructions are incorporated into the actual processor design. The processor 110 may essentially be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software modules 132, 134, 136 for controlling the processor 110. Other hardware or software modules are contemplated. The storage device 130 can be connected to the system bus 105. In one aspect, a hardware module that performs a particular function can include the software component stored in a computer-readable medium in connection with the necessary hardware components, such as the processor 110, bus 105, display 135, and so forth, to carry out the function.

Figure 2:
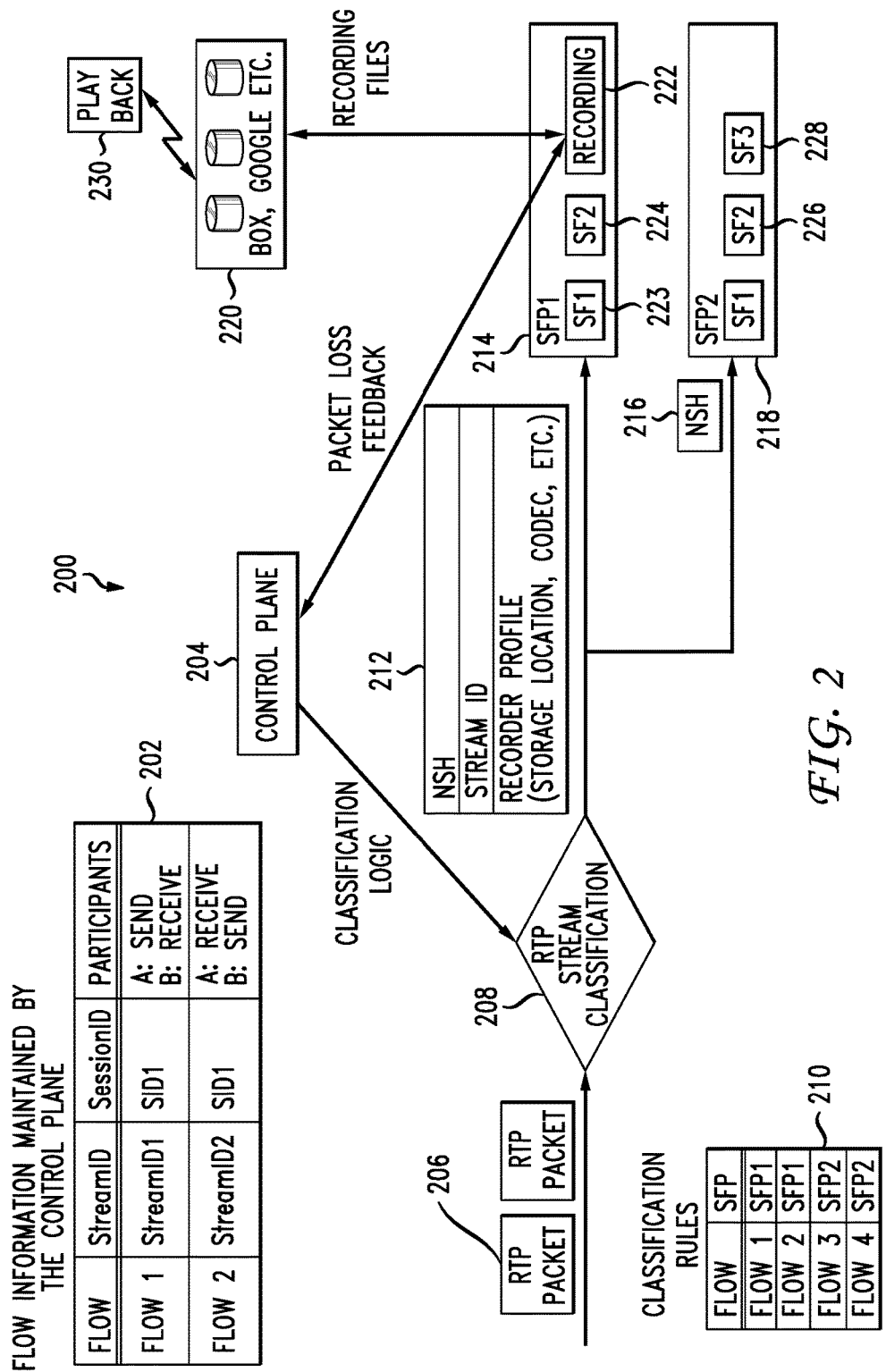
FIG. 2 illustrates architecture which includes a control plane, a media plane, and a storage provider for enabling a quality aware recording functionality.

FIG. 2 illustrates the system components 200 which describe an example embodiment. A control plane 204 is established which handles setup and teardown of signaling sessions between the calling and called participants or among the conference participants (not shown). A device can also be a participant to a communication. A media plane can include the RTP stream classifier 208 and Network Service Functions 223, 224, 226, 228 that perform various processing on the media streams in real-time such as recording 222. The network service functions can be organized into separate service function paths 214, 218. Each separate service function path can process the various media streams that require the particular series of functionality provided by each individual service function. Storage providers 220 are provided in the collaboration cloud that can store the recorded media files within the same cloud or interface with 3rd party storage providers such as Box, Google, Amazon, etc. The scalability of recording from the storage provider perspective 220 is handled by the individual providers. The control plane 204 maintains high level metadata 202 about each of the media streams it is processing and/or managing.

Example functionality for the individual service functions 223, 224, 226, 228 could include converting from RTP to SRTP, a transcoding component such as changing the payload from one codec to another, social media functions, and so forth. In one aspect, individual service functions 223, 224, 226, 228 can also provide unidirectional or bidirectional communication with the control plane 204. For example, information about the respective processing performed by these individual service functions can affect the quality of recording the session. Accordingly, the control plane may not only receive quality related data from the recording function 222, but can receive other data which can directly indicate packet loss or other degradation of quality directly or could include tangential information from which it could be inferred that a loss of quality or a reduction in quality may or is being experienced with respect to the recording. Such information can be utilized independently or in combination with quality information for the recording function 222 to arrive at decisions on whether to update the classification logic for the RTP stream classifier 208 and if so, how to revise the logic so as to cause a migration of a stream from one service function path to another.

In another example, the SF1 223 in SFP1 (214) can add metadata to a packet or packet header. The added metadata can be passed on by SF2 (224) to the recording module 222 which can be processed or passed on to the control plane 204 to increase the understanding of potential packet loss or other issues which can affect the quality of a recording. In one aspect, SF2 (224) can add to the metadata, and perform a function based on the metadata, remove the metadata, or modify the metadata. The broader point is that with respect to providing quality aware recording, other service functions in the service function path 214 can perform specific analyses or processing with respect to their functionality which can impact the quality of recording. This information can be generated, processed and passed on such that it can ultimately be utilized in potentially updating classification logic transferred to the RTP stream classifier 208 for making classification decisions. Ultimately, any one or more of the following pieces of information can be utilized to provide quality-aware recording: the source port and/or address, the destination port and/or address, what information is in the RTP packet, how the classification rule is applied, external information about performance or triggering events, user profile information, service level agreement data, social media data associated with participants or the communication, and so forth.

The RTP stream classifier 208 processes incoming RTP packets 206 and determines, based on analysis of the packets, a chosen service function path for processing or managing the packets. The optional paths are logical chains of service functions as a shown in FIG. 2. The stream classifier 208 can also process any other type of packets as well. The RTP stream classifier 208 only looks, in one aspect, at RTP packets, and determines to which path to send the packet. The RTP stream classifier 208 implements classification rules that defines, when the classifier receives a packet, that it belongs to flow 1, the classifier 208 needs to take and send it to service function path 214 (SFP 1) or service function path 218 (SFP 2). The tables and functionality get controlled and programmed by the control plane 204. The classification logic is pushed by the control plane 204.

The system could also use alternate nodes or entities beyond the structure shown in FIG. 2. Accordingly, an aspect of this disclosure includes application of the basic functionality described herein but not necessarily performing that functionality using the exact structure disclosed in FIG. 2.

Examples of sessions established by the control plane 204 can include internal calls between endpoints registered to the same cloud provider, inbound calls from external SIP service provider to an endpoint registered to the cloud and outbound calls from an endpoint registered within the cloud to an external public switched telephone network (PSTN) caller. A user or participant can also be a device such as a speech processing system.

For sessions that need to be recorded, the control plane 204 sets up the signaling session such that RTP streams flow through its media plane. For sessions that do not require additional media processing, a direct media connection is established between the source and destination endpoints/devices or a Service function path that doesn't have the Recording service function is utilized.

The following describe the method to deliver recording as a service. First, the control plane 204 maintains information 202 for all active media streams and exposes this information to the Network Service Function via an API interface. This information can include: 1. Flow details, such as one or more of the following parameters: {Src IP, Src port, Dest IP, Dest port, Protocol}; 2. Stream ID, which is a unique identifier for the media flow; 3. Session ID, which is the session ID of the communication session to which the media flow belongs to; 4. A boolean parameter indicating whether the media flow needs to be recorded or not; 5. Parent Tenant IDs, which can be a list of tenants to which the media stream is associated with (origination and destination tenants of a media stream may be different); 6. A recording tenant ID, which is a subset of parent tenant IDs that require this stream to be recorded; 7. A recording profile parameters (recording format); and/or 8. A secure real-time transport protocol (SRTP) key parameters required to decrypt the media flow.

The session ID is something specific to signaling that allows the system to track a call end-to-end even if there are different call legs that are set up. Assume that a user calls into a contact center, the call may be processed by several different products. From an end-user perspective, all of the call legs which are established to connect to the various products appear to be one single call. Previously, one would have to manually collate all of these call legs. Now, there is a session ID, there are some unique IDs that are used, that allow the call to be tracked end-to-end, even if there are multiple call legs. The system can track each product that the call is connected to. This is a unique identifier for a call. The session ID is a particular identifier configured for a particular protocol, such as a SIP signaling protocol, and identifies the session from an end-user perspective. However, other similar functionality could be built into a different version of a session ID or whatever protocol may be used. Thus, an identifier could be used to identify a session, independent of a specific protocol that is used to establish, maintain and manage that session.

The stream ID relates to an individual media stream. The stream ID can be structured in a tuple with a source address of the destination address as well as other information. It can maintain who was sending what, whether the communication is bidirectional, and so forth. It maintains a high level metadata table.

The control plane 204 uses one or more pieces of the above information to determine the chain of Network Service Functions, or the Service Function Path (SFP), for each media flow. For example, the control plane 204 can include the Recording 222 Network Service Function in one service function path SFP1 (214) if the media flow needs to be recorded. Once the path 214, 218 is determined, the system configures the RTP stream classifier 208 at the media plane with {Src IP, Src port, Dest IP, Dest port, Protocol} Service Function Path (SFP) mapping logic. There may be more than one SFP for a given media flow in which case each SFP is associated with a priority or an identification of which path should be used for which portion of a flow. Note in FIG. 2 that the chain of network service functions (SFP1) 214 includes the recording function 222 while the chain of network service function path (SFP2) 218 does not.

Next is described the life of a RTP packet 206. After the communication session is established by the control plane 204, the control plane 204 programs the RTP Stream classifier 208 with {Src IP, Src port, Dest IP, Dest port, Protocol} or a Service Function Path (SFP) mapping. In the example of FIG. 2, assume that SFP1 (214) has a higher priority than SFP2 (218). The SFP with the highest priority is the most preferred path. In one aspect, the organization of the paths when there are multiple paths can be based on other factors besides a simple prioritization. For example, system performance, timing elements, other triggering events, could be applied and reported to the control plane 204 such that the classification logic 208 can direct streams to the appropriate path. The controller generates a universally unique identifier (UUID) to uniquely identify each stream and passes it as the stream ID to the RTP stream classifier 208. The controller can also use ice-ufrag if available as a unique stream ID. The "ice-ufrag" is the interactive connectivity establishment (ice) user name fragment. The "ice-ufrag" attributes convey the user name fragment and password used by ice for message integrity. For more information, see https://tools.ietf.org/html/rfc5245#section-15.4.

The RTP stream classifier 208 is the entry point for all RTP packets 206 handled by the media plane 200. The classifier 208 looks up {Src IP, Src port, Dest IP, Dest port, Protocol}—SFP mapping table 210 and selects the mapped SFP with the highest priority or other parameter for selecting a mapped path. The RTP stream classifier 208 forms a Network Service Header 212 with the selected SFP ID along with stream ID as metadata. The NSH header 212 and RTP packet 206 is encapsulated in an outer header (GRE for example) and sent to the Service Function chain SFP1 (214) as a NSH packet. Other formats could be used as well in terms of the protocol or structure of the packet besides the NSH structure. If the media needs to be recorded, then the classifier 208 will choose a service function path that includes the service function recording feature or module. The logic to perform this functionality is provided by the control plane 204 to the RTP stream classifier 208. Thus, to enable the functionality of the classifier 208 being able to route a particular stream to the appropriate service function path 214, 218, the system needs two pieces of information. The first piece of information is the stream ID and the next piece of information is the recorder profile. As the packet is received, the classifier 208 adds an NSH header which includes the stream ID and the recorder profile.

Assume that the NSH packet is provided to the service function path 214, which includes the recording feature 222. The NSH packet traverses the SFs 223, 224 in the Service Function chain 214. The packet reaches the recording service function 222 which uses stream ID value from the NSH metadata as a key to look up a list of active recording buffers. If a buffer is found, the RTP packet is copied to the buffer. If lookup is not successful, it creates a new recording buffer in the list with stream ID as the key and adds the RTP packet to the buffer. Note the buffers can be stored in a cloud storage 220 where the recorded data is stored encrypted. After a period of time of buffering packets in the buffer, the recording service function 222 begins to transmit the files to cloud storage 220. For example, after one minute of buffering a media stream, the recording service function 222 could begin to transmit the recording content to the cloud storage 220. The approach disclosed in application Ser. No. 14/643,802, incorporated herein by reference, can be used to store the data in cloud in an encrypted manner.

The recording service function 222 uses an application programming interface (API) with the control plane 204 to retrieve a tenant ID and/or a recording profile information for the given media stream. Thus, there can be bidirectional communication between the recording service function 222 and the control plane 204. The recording profile can also be included as part of the NSH 212. The recording profile can include such information as storage logic, a chosen codec, a preferred codec, and/or a list of prioritized codecs. The recording service function 222 converts the RTP packets in the media stream's local recording buffer into a recording file as per the format specified in the recording profile. The recording service function 222 then uploads the contents of the recording file to the storage location (Box, Google etc.) 220 of each Tenant that has requested recording. The conversion and upload task can happen as the service function receives RTP packets or the service function 222 can store it in a temporary buffer and do it periodically (e.g. 1 min). If the recording file for this stream already exists in the cloud, the new media section may be appended to the existing file. Alternatively the recording SF 222 can create multiple files but index them using the stream ID as a key. All the related files of a given stream stored in cloud would have same stream ID key and be therefore connected or chained together. A search based on stream ID would return the list of files.

In another aspect, the NSH can include a tenant ID. The tenant ID could identify which cloud storage provider the system should be utilized for recording that stream. The tenant ID can be identified in the NSH, or communicated from the control plane 204 to the recording service function 222. For example, if the tenant ID identifies Google, Box, or Amazon, and so forth, as a particular cloud storage provider, the recording service function 222 can establish the communication with the chosen provider for storing the data associated with the stream ID. This approach allows the system to scale. In the existing architecture, the call controller and the recording element must have a SIP call communication established which can be limiting in terms of scale. The improvement disclosed herein is that there is a logical component (which may need some API interfaces) that is processing on the media and thus, from a scaling perspective, the new approach can make scaling much easier.

Further, how does one make the system intelligent enough such that it knows when something is happening with respect to the quality of the media. There are some scenarios where there is a requirement to have zero loss in the recording. If the network is experiencing some loss, then the system should be dynamic enough to pull in other resources to provide for zero loss. In the existing architecture, the control plane is not aware of such loss. Each of these service functions can provide feedback back to the control plane 204. The feedback represented from the recording function 222 and the control plane 204 can also represent feedback from the other functions 223, 224 or the service function path 214. It is noted as well that the communication can be bidirectional between the control plane and/or the service function path 214 or other individual service functions. In other words, data, feedback, or any other communication can be exchanged between the control plane 204 and the other components. The recording service function 222 can also maintain statistics of the success of receiving packets, or details about jitter, and so forth. The recording service function 222 can report that back to the control plane 204 and dynamically report that a particular SFP 214 is experiencing problems. In this case, the system can dynamically change the classification logic in the RTP stream classifier 208 as directed from the control plane 204 so that the stream is no longer going to go to SFP 1 (214), but is rerouted to go to a new SFP 11 (not shown). The SFP 11 (now shown) could be in a particular cluster of processing elements that is geographically separate or in improved position. Perhaps the processing is being moved closer to the user's location. The new cluster of service functions could be performing at a higher performance level than the initial path. The position of the new service functions could also provide improved bandwidth, improved hardware processing, and so forth. Any improvement parameter could be the basis upon which the control plane 204 provides updated classification logic to the RTP stream classifier 208 in order to migrate a particular stream from an underperforming service function path 214 to a new service function path, which can include the same or equivalent service functions as required by the stream, but which can provide the necessary quality for recording the media associated with the stream.

Included herein would be all of the necessary control elements to pause a recording from a first recording service function 222 and reengage or reestablish the recording from a new SFP 11. Utilizing the various data about the stream, such as the stream ID, the recorder profile, the tenant ID, and so forth, and enable the system to migrate from one service function path to another. The storage provider 220, for example, may be in the middle of recording a certain media stream when the control plane 204 migrates the recording from one service path to another. The storage provider 220 can identify a location at which the stream is paused or stopped and subsequently received from the new recording service function in SFP 11, in order to either start a new file for the recording or to expand and continue recording using the existing file from the first SFP.

There is no perceived change from the user standpoint, but there is a change in service function path to which a stream is assigned. In one example, assume a call is being set up at 10 MB per second, and the recording of the call is very important. If the system experiences packet loss which can affect the quality of the recording, then the system can take some action to lower the bandwidth, or increase the bandwidth, or some other action.

In addition to forking RTP and storing in the cloud, the recording service function 222 can use the control plane's API interface to retrieve metadata required and store them along with the recorded data in the cloud. The metadata may be indexed using SIP session ID as key information. Alternatively, some other identifier (like conference ID, participant ID etc. which can be shared with playback application) can be used as an index key to store the metadata. The metadata can follow the format defined in draft-ietf-siprec-metadata. If the SIPREC metadata is used, the associated stream ID is stored as metadata's<stream>XML element's UUID.

After processing the NSH packet, the recording SF 222 passes it to next SF in the chain 214. The last SF in the chain removes the actual RTP packet from the encapsulated packet (GRE) and sends it to next Layer 3 network hop.

Next is discussed the concept of quality aware recording. The recording SF 222 also computes and maintains media quality statistics for each active recording session. It periodically reports media quality statistics information to the control plane 204. The recording service function 222 could also report media quality data directly to the stream classifier 208 and/or any other node. The reporting of the data enables the control plane 204 to be recording-quality aware and invoke specific actions such as triggering a signaling update to negotiate a low bandwidth codec for the recording stream.

The recording SF 222 could also send the recording quality information to the RTP stream classifier 208 which can invoke specific actions such as choosing the next preferred SFP if the current recording SF 222 is experiencing poor media quality There are several ways to stop a recording session: (i) The recording SF 222 can detect end of stream by means of having a configurable media inactivity timer. If no RTP packets are received within the expiration time, the stream is considered inactive and the recording session is stopped; and (ii) Alternatively, the control plane 204, on receiving a disconnect for a communication session, can request the recording service function 222 to stop the recording session by passing the corresponding stream IDs.

When the recording is stopped, the remaining RTP packets of the recording buffer are appended to the existing recording file in the storage location.

Another aspect of this disclosure is how to retrieve recordings from the storage provider 220. The stream ID can be used as a key for identifying the stream for playback. A playback application 230 can use the session ID and stream ID to fetch the list of recording files from the cloud 220 for a given communication session. If the streams are stored encrypted in the cloud, the mechanism mentioned in application Ser. No. 14/643,802 (CPOL-995420), filed Mar. 10, 2015, entitled Recording Encrypted Media Session, can be used by playback application to decrypt the files and play the recordings. The contents of application Ser. No. 14/643,802 are incorporated herein by reference A participant in the communication session can utilize a site or an application on a device such as a desktop computer or a mobile device, and later retrieve the recorded file associated with the communication session from storage 220. The device 230 can store the session ID and stream ID or can access over a network, a database (not shown) of such information. The database could communicate with the control plane 204 and/or the cloud storage entity to 220 to obtain such information. Furthermore, the database can organize and index the session ID and stream ID such that a user via device 230 could provide information such as the other participant in the communication, the date of the communication, or other identifying information which can be used to retrieve a session ID and/or stream ID which were provided to the storage entity for retrieving the recording.

As recordings between individuals may be desired to be kept private, more secure access can be provided. For example, a password can be provided, or information about the other participants in the conversation can be requested. The system can request identification of the date or time of the recording of the communication or when the communication session occurred, and so forth.

In one aspect, assume that the buffer associated with recording module 222 is one minute long. Accordingly, one minute groupings of packets are transmitted to the storage facility 220. The groupings can be organized into a single file in the storage facility 220 which has an associated stream ID that is a key for later access. The system could also record individual one minute long files in the storage facility 220 for later retrieval. These files could be identified by the stream ID plus a chronological ID that the user could identify the 14$^{th}$ minute of recording within a particular stream ID. Automatic speech recognition or other speech processing could also be applied to the audio such that content-based searching could also be performed. The stream ID is used to retrieve all associated files. The session ID could also be used as well. For example, if a user called a call center and talked with several different individuals, there may be multiple stream IDs associated with the overall experience. The session ID can encompass multiple stream IDs and be associated with the overall session.

It is also noted that, as a shown in FIG. 2, any data can be communicated in bidirectional way between the storage facilities 220 and the recording function 222. While the content will typically flow from the recording function 222 to the storage facility 220, other control signals, feedback, reporting data, and so forth can flow bidirectionally between these two entities. The storage facility 220 could also indicate generally with the service function path 214 or the other service function paths or any other service function as well.

Figure 3:
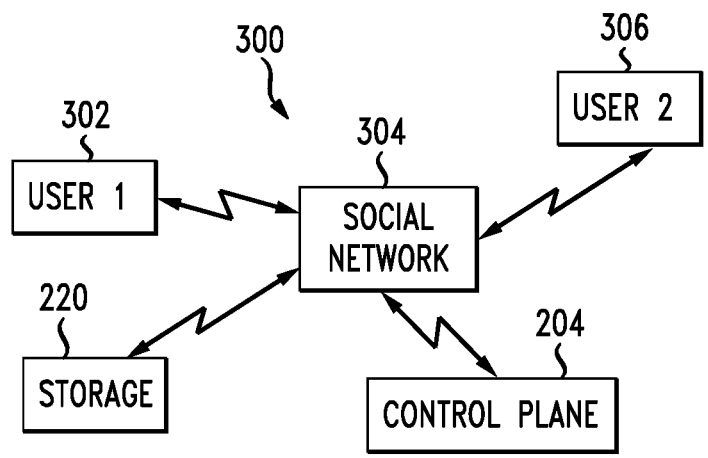
FIG. 3 illustrates a social networking aspect to this disclosure.

One aspect of this disclosure relates to social media. FIG. 3 illustrates a general coordination between social media and the recording platform 200 disclosed in FIG. 2. For example, in the architecture 300 shown in FIG. 3, a first user device 302 communicates with a social network 304 which is also communicating with a second user 306. The social network can be any social network such as Facebook, Twitter, Instagram, Tumblr, LinkedIn, Pinterest, Snapchat, email, texting applications, and so forth. Any communication medium which can be utilized to connect individuals in one way or another can be applicable. This can include dating sites, Skype, text messaging, or any other communication means. In any such communication, an identification of the participants is available. From any such social media or communication interface, additional functionality can be included which can transition the communication into a recordable event. For example, users of Facebook may be involved in the Facebook chat through the messenger application. The users may decide they would like to have an audible discussion and click on a button or interface with the system in some manner to initiate a call and/or a video conference. The system can then transition the users to have that communication managed by the control plane 204 and the features described above relative to FIG. 2. The flow information 202 maintained by the control plane 204 can be populated with information about the participants, their available communication means, and so forth. An API can be utilized to query how each individual user would transition to a call or a video session. For example, one user may be at a desktop computer with a headset and a video camera. Through the social media applications or through a browser, the system can communicate to the control plane 204 or some other entity, the capabilities of the first user 302. Assume the second user 306 is using a mobile device for the social media communication. The second user device 306 can report its ability to handle a telephone call. The control plane 204 or some other entity can harmonize the available communication means of each device and determine how to establish a communication session between the users. In the above example, the system can determine that a telephone call is the easiest mechanism for establishing the communication. In this case, assuming that the system has received an interaction via the social networking communication mechanism that the users desire to shift to a telephone call, the system can automatically transition the users to such a call. Any mechanism of accomplishing this establishment can be utilized. For example, the system could call the telephone number of the device 306 as well as initiate a session via Skype with device 302 and connect the users via the network in any manner required. When the users transition to the telephone call in this example, the ability of the control plane 204 to manage the communication through a selected service function path 214, 218 can be implemented. The social networking interface through which the users indicate a desire to transition to an audible communication, can also include options, such as a recording option button, which can guide the control plane 204 to determining which service function path will be selected or which should take priority for the communication.

FIG. 3 illustrates a communication between the social network 304 and the control plane 204. This is meant to be a general representation of the fact that communication can occur between the social networking site and an entity, such as the control plane or other entity, which would manage and establish the telephone call or other type of communication.

At this stage, the communication would be handled and managed as set forth above with respect to providing quality aware recording in a storage entity 220.

Figure 4:
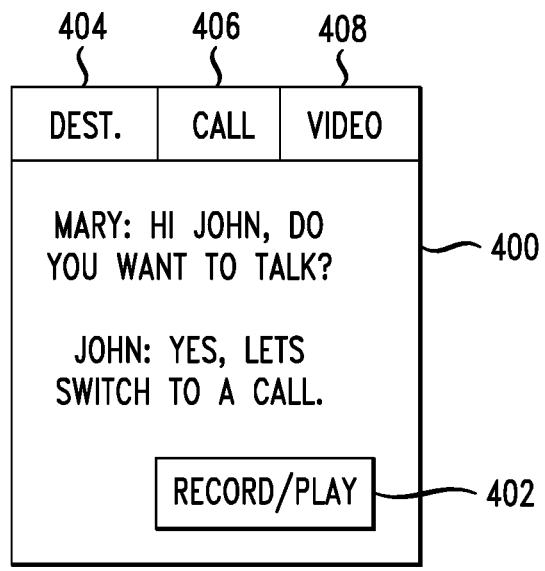
FIG. 4 illustrates an approach to retrieving a recording via social media.

Following the end of the audible communication, either of user 302 or user 306, or only one of the users 302 and 306 under certain circumstances, may retrieve the recording in the storage entity 220. For example, the retrieval method can be implemented via the social media communication interface. An object could be presented via the social network 304 which a user can interact with to retrieve the recording. FIG. 4 illustrates an example interface 400. Assume this interface is a simple messenger or texting interface. This could be a Facebook messenger, a comment thread on a social network posting, a common thread as part of a news article, a chat between a support site and a user of a product, a video related interface, or any other mechanism in which users might be communicating. Options can be presented such as chat 404, call 406, or video 408. These options generally represent the ability to transitions from a texting (or other social media interface) interface to a new form of communication which can be recorded. In a general texting application, there are simply two users which can be of course identified and a communication path be established.

In other scenarios, say when multiple users are commenting on a news article, individual users can engage in a conversation amidst other users. In such a scenario, the interface can provide the ability of one user to request a call or a new mode of communication with another user. For example, if Mary, John and Jane each provide a comment about a news article or posting, and Joe responds to Jane's comment, and Jane in turn response to Joe, a mechanism is presented which would enable Jane and/or Joe to request a telephone call with the other person. Once the participants are identified, the available means of vindication established and confirmed, and a communication session then initiated, the flow can continue as described above with respect to which service function path(s) is/are utilized to achieve the particular functionality desired by the users, including recording the call.

Other service functions in a path 214, 218 could also be implemented based on the particular functionality of a social media network. For example, if two users engage in a conversation initiated from Facebook or Instagram, a path could be chosen which includes additional functionality which is presented to the users. For example, relevant pictures to the conversation could be coordinated and presented to the user for posting on the social media network.

Also shown in FIG. 4, is a button 402 which can be presented as part of the social networking communication sessions when a recording exists in the storage entity 220. The reason for placing the button 402 in this location is that Mary or John, the people communicating in FIG. 4, can return back to their communication which initiated the audible communication session. This provides an easy mechanism for either of them to interact with button 402, which would initiate a communication between the social network 304 and storage 220, as is shown in FIG. 3, to retrieve that communication between the individual users. The social networking site 304 can maintain the session ID and/or stream ID which would be necessary to batch the recorded file or list of recorded files from the cloud storage entity 220. The social networking site 304 could also include a separate interface in which recorded communication between the individual user and friends or acquaintances in their social network are recorded. Both kinds of notifications could also be provided as well. In other words, the system could provide a button 402 that is intractable which can be used to retrieve a recording between individuals communicating via the social network. Separately, the system could provide a drop-down menu or some other interface which could provide a list of recordings for an individual user. Thus, if Mary in FIG. 4 has a telephone conversation with John that is recorded and a videoconference with her grandmother that is also recorded, Mary could access a drop-down menu which would list those two recordings and any other associated data or metadata around those recordings.

In another aspect, the button 402 could be used to initiate the recording of a call that is going to take place. For example, the button 402 could appear based on an analysis of the language of the text session (shown in FIG. 4) which indicates that the participants want to switch to a call. The button could perform one of more of the following functions: (1) initiate a call between the parties at designed numbers or locations; (2) record the call between the parties; and/or (3) other network functions, such as initiate a different kind of communication session, video session, different language services, and so forth. The labeling of the button could reflect the functionality. For example, feature 402 shows "recording/play" which represents either the recording function or the play function. Alternate labeling could include "establish call" or "call and record". Button 402 can also represent several options such that the individual functionality could be broken out into separate buttons. Thus, the participants could choose to either simply set up a call without recording or to set up the call and record. Further, the system can analyze the dialogue when determining what buttons to present. For example, if John said "yes, let's switch to a call and record it," then the system could analyze that language and present a single button 402 which would implement the call as well as the recording functionality. These selections could also have bearing on which service function path the call gets routed to by the system shown in FIG. 2.

Of course while the example set forth above primarily discuss recording and audible medication such as a call, other forms of communication can also be recorded in a similar manner. Facetime video calls, Skype video calls, screen interactions, virtual reality experiences, display images, could all be recorded depending on the appropriate context of a communication between two people. Furthermore, interactions between humans and machines such as through speech recognition systems or interactions with avatars could also be recorded in a similar manner.

Of the various embodiments disclosed herein, the functionality that can be claimed by way of example can be addressed from different viewpoints. For example, the functionality performed by the control plane tool for can provide one claim set. Another claim could be focused on the functionality from the media plane, which includes the RTP stream classifier 208 and the various network service functions 214, 218 that perform the various processing on the media streams in real time. One embodiment could be from the standpoint of the storage provider 220. The various signals that are transmitted and received in the functionality performed by each of the separate entities can be separately claimed. All of the functionality that would be necessary to perform any such steps from the respective standpoint can be included within this disclosure even if not expressly described. For example, FIG. 2 illustrates the recording service function 220 transmitting a recording file to the storage provider 220. Thus, if the claim is from the standpoint of the media plane, the claim can include a step of transmitting a recording to a storage entity. Similarly, the disclosure then would be presumed to include the concept, from the standpoint of the storage provider 220, the step of receiving a recording from the media plane. Metadata, control data, content, and so forth are generally presumed to be communicated between the various entities, which communications can also include communications via specifically defined APIs. Similarly, communications between the social network 304 and any of the entities shown in FIG. 3 are also considered to be separate embodiments. For example, the signals received, functions performed, and communication from a social network 304 can also be separately addressed in the claims. All such functionality as would be needed to perform the steps disclosed herein, are applicable and presumed as part of any specific example or embodiment, even if not expressly described.

Figure 5:
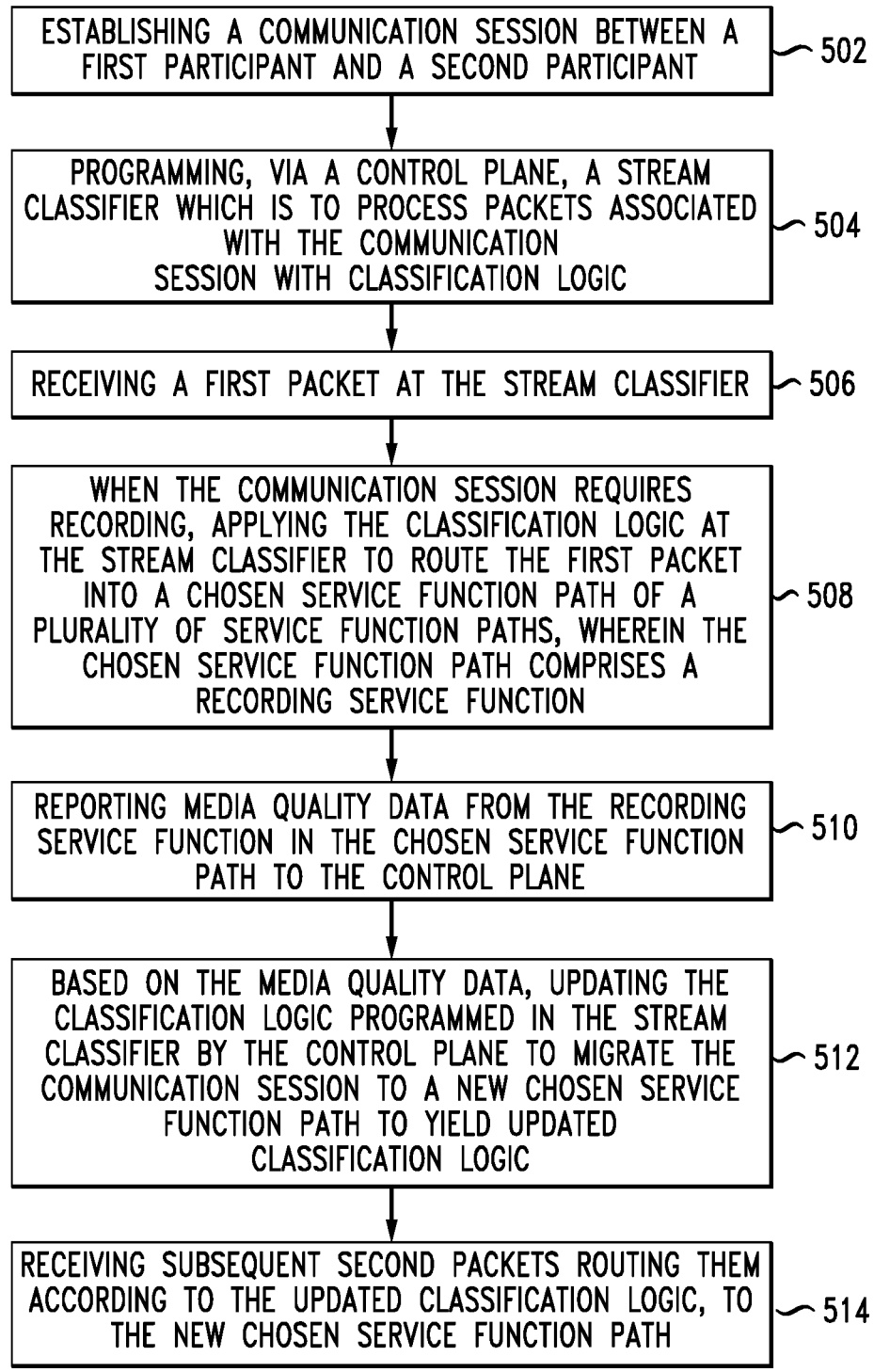
FIG. 5 illustrates a method aspect of this disclosure.

FIG. 5 illustrates an example method embodiment. A method includes establishing a communication session between a first participant and a second participant (502), programming, via a control plane, a stream classifier which is to process packets associated with the communication session with classification logic (504), and receiving a first packet at the stream classifier (506).

When the communication session requires recording, the method includes applying the classification logic at the stream classifier to route the first packet into a chosen service function path of a plurality of service function paths, wherein the chosen service function path comprises a recording service function (508), and reporting media quality data from the recording service function in the chosen service function path to the control plane (510). Based on the media quality data, the method can include updating the classification logic programmed in the stream classifier by the control plane to migrate the communication session to a new chosen service function path to yield updated classification logic (512) receiving subsequent packets at the stream classifier and routing them, according to the updated classification logic, to the new chosen service function path (514).

The method can further include forming a network service header identifying the chosen service function path and a stream ID associated with the communication session. This step can be performed at the RTP stream classifier 208 or in another module. In one aspect, the first packet and the second packet are real-time transport protocol packets. The structure of the packets can also be other than RTP packets. The recording service function can retrieve a tenant ID that identifies a recording service provider 220 to record the communication session. The tenant ID can be retrieved from the control plane via an application programming interface or included in a network service header. It is noted that any two components communicating herein can communicate via an API. For example, the control plane, the media plane, a social media entity, an application on a mobile device that is utilized to access the recording, a call center accessing a recording, or any other entity that receives or transmits data in order to implement qualities aware recording using service function changes disclosed herein can communicate via a customized API with any other entity.

Routing the first packet to the chosen service function path can include routing the first packet with a recording profile that identifies at least one parameter associated with recording the communication session. The recording service function can retrieve data required to store a recording of the communication session. Such data can include at least one of a conference ID, a participant ID, a session ID, a stream ID, a date, a time, social media data, external data, content associated with the communication session, security information, policy information associated with retrieving the recording of the communication session, and a document ID for a document associated with the communication session.

In another aspect, the media quality data further can include data received from a service function in the chosen service function path, wherein the service function differs from the recording service function.

Figure 6:
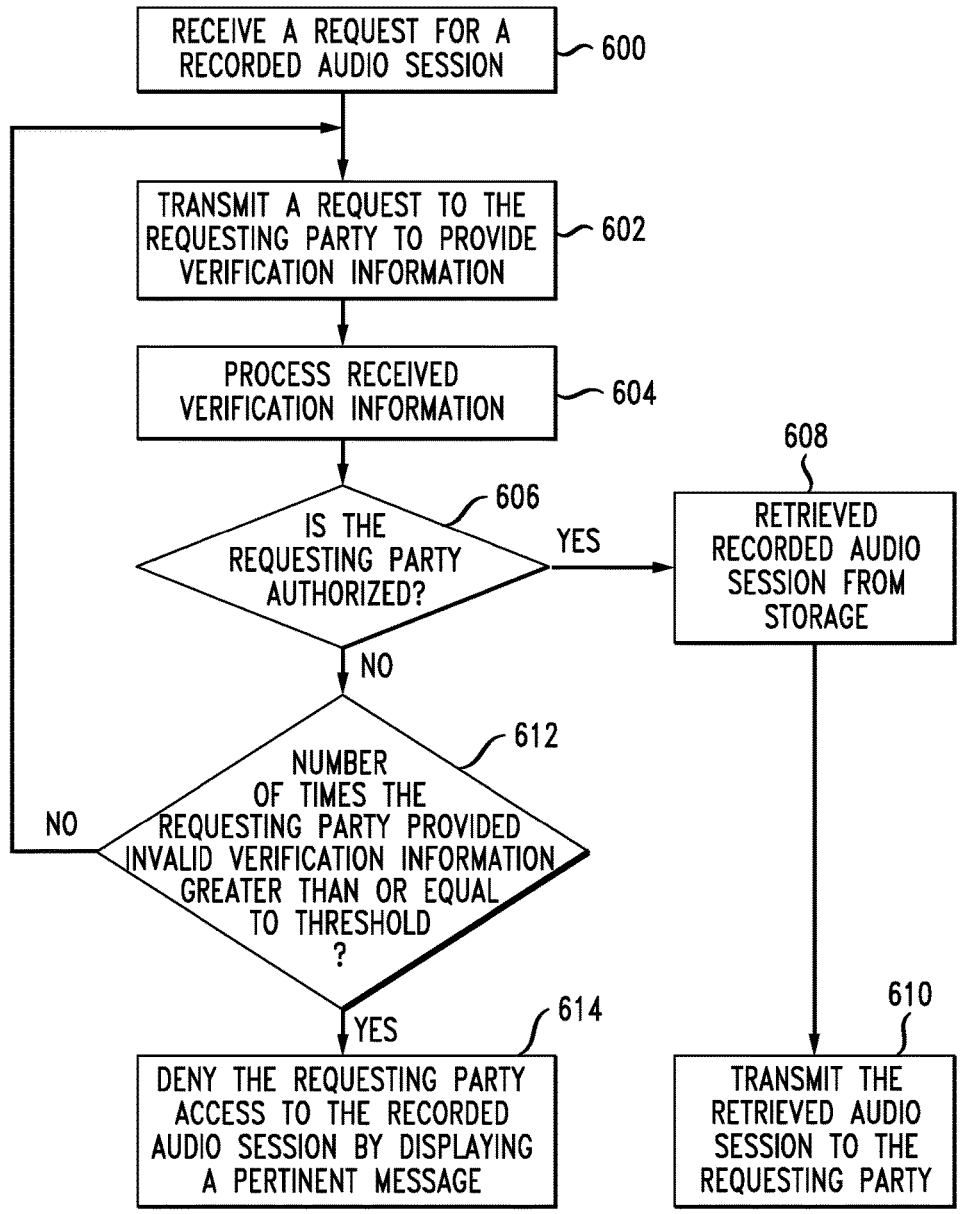
FIG. 6 illustrates a method aspect of this disclosure.

FIG. 6 illustrates a method aspect of this disclosure which relates to retrieving a recorded session initiated from the context of a social networking session. Again, while audio is reference, the recording session to be any type of recording session including images, video, interactions between users or between humans and devices, and so forth. FIG. 6 illustrates a method for retrieving a stored recording via a social network. The method includes receiving a request for a recorded audio session from a participating party such as user 302 or user 306 described above with reference to FIG. 3 (600). The request may be received at a social network server 304 of the social network through which users 302 and 306 interact. In one example embodiment, the request may be received via an object presented to users 302 and/or 306 on a social media communication interface through which the users 302 and/or 306 communicate. As described above with reference to FIG. 4, users 302 and 306 may be exchanging messages via the social media communication interface (e.g., a Facebook chat room). At some point during the conversation, users 302 and 306 may have switched to an audio/video communication session (which is recorded and stored according to example embodiments described in this application such as that described with reference to FIG. 2. Upon a termination thereof, the object 402 may appear on the screen of the social networking interface that enable users 302 and 306 to transmit a request to the social network server for retrieval of the previously recorded audio communication (hereinafter referred to as the recorded audio session).

The method further includes transmitting a request to the requesting party to provide verification information (602). The verification information may include, but is not limited to, information corresponding to the date and time of the audio session, a user's password for logging into the social network, one or more personalized security questions, a fingerprint, etc. In one example, the request for verification information may be provided as a pop up screen to the requesting party on a screen of the requesting party's device. In another aspect, the system may be able to identify a sufficient level of certainty, a particular recording session and not need specific verification information. For example, the two parties communicating in a social media network may only have a single recording session and simply making the request by one party is sufficient to identify the session.

Upon receiving the requesting party's response to the verification information, the social network server processes the received verification information to determine if the requesting party is authorized to retrieve the audio session (604). The social network server determines whether the processed information at 604 indicates that the requesting party is authorized to access the recorded audio session or not (606). If the social network server determines that the requesting party is authorized, the social network server retrieves the recorded audio session from the storage 220, as described above with reference to FIG. 3 (608). Thereafter, the social network server transmits the retrieved audio session to the requesting party (610).

In one example, there may be more than one recorded audio session between users 302 and 306. Accordingly, after receiving the request at 600 and/or concurrently with requesting the verification information at 602, the social network server provides the requesting party with the option of choosing one of the available audio sessions (e.g., by presenting a drop down menu on the requesting party's device).

Referring back to 606, if the social network server determines that the requesting party is not authorized, the social network server determines whether a number of times the requesting party has provided invalid/insufficient verification information is equal to or greater than a threshold or not (612). The threshold may be an adjustable parameter (e.g., set to 3) that limits a number of attempts by the requesting party (possibly an unauthorized requesting party) to access the recorded audio session, for security purposes.

If the social network server determines that the number of attempts equals or exceeds the threshold, the social network server denies the requesting party access to the recorded audio session by displaying a pertinent message on a screen/display of the requesting party's device (614). In one example, the requesting party may then have to wait for a period of time (e.g., a few hours, 24 hours, etc.) before attempting to retrieve the recorded audio session. Alternatively, the requesting party may be asked to log out of the social network service and log back in, in order to attempt retrieving the recorded audio session.

If the social network server determines, at 612, that the number of attempts is less than the threshold, the social network server reverts back to 602 and re-transmits the request for verification information to the requesting party. In one example, the social network server may alter the type of verification information requested from the requesting party. For example, if on the first attempt, the requesting party is asked to provide his or her password for the social network and the provided password is incorrect, then on the second attempt, the social network server may request a different kind of verification information to be furnished by the requesting party (e.g., one or more security questions such as date of birth, name of your first pet, etc.). Thereafter, the social network server repeats the processes 604 to 614, as appropriate.

In one aspect, any of the functionality described above with respect to approaches to initiating a recording between two users of the social network 304 or retrieving a stored recording between two individuals can be performed by one or more of the social network 304, the control plane tool for, and stores 220. The overall concept relates to how to connect users of the social network into the system of FIG. 2 which provides particular details on how to manage quality aware recordings using service function chains. As noted above, particularly programmed service functions can be included within service function chains in order to enable the medications between a service function path and a social network 304. This concept can greatly enhance the usability of such a quality aware recording system as well as the accessibility by individual users to recordings.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rack mount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method comprising:
   establishing a communication session between a first participant and a second participant;
   programming, via a control plane, a stream classifier which is to process packets associated with the communication session with classification logic;
   receiving a first packet at the stream classifier, the first packet including a stream ID;
   when the communication session requires recording, applying the classification logic at the stream classifier to route the first packet into a chosen service function path of a plurality of service function paths, wherein the chosen service function path comprises a recording service function;
   identifying a buffer for the recording service function to record the first packet in, comprising:
      locating, using the stream ID as a key, a buffer from a list of active buffers;
      creating, in response to the locating failing to locate a buffer from the list, a new buffer in the list with stream ID as a key of the new buffer;
   recording, the recording service function, the first packet to the identified buffer;
   reporting media quality data from the recording service function in the chosen service function path to the control plane;
   based on the media quality data, updating the classification logic programmed in the stream classifier by the control plane to migrate the communication session to a new chosen service function path to yield updated classification logic;
   receiving subsequent packets at the stream classifier; and
   routing them, according to the updated classification logic, to the new chosen service function path.

2. The method of claim 1, further comprising forming a network service header identifying the chosen service function path and the stream ID associated with the communication session.

3. The method of claim 1, wherein the first packet and the subsequent packets are real-time transport protocol packets.

4. The method of claim 1, when the recording service function retrieves a tenant ID that identifies a recording service provider to record the communication session.

5. The method of claim 4, where the tenant ID is retrieved from the control plane via an application programming interface or included in a network service header.

6. The method of claim 1, wherein routing the first packet to the chosen service function path comprises routing the first packet with a recording profile that identifies at least one parameter associated with recording the communication session.

7. The method of claim 1, wherein the recording service function retrieves data required to store a recording of the communication session, and wherein the data comprises at least one of a conference ID, a participant ID, a session ID, the stream ID, a date, a time, social media data, external data, content associated with the communication session, security information, policy information associated with retrieving the recording of the communication session, and a document ID for a document associated with the communication session.

8. The method of claim 1, where the media quality data further comprises data received from a service function in the chosen service function path, wherein the service function differs from the recording service function.

9. The method of claim 1, wherein the media quality data comprises media quality statistics for an active recording session associated with recording the communication session.

10. A system comprising:
    a processor; and
    a computer-readable storage device storing instructions which, when executed by the processor, cause the processor to perform operations comprising, in each switch of a plurality of switches in a network fabric:
       establishing a communication session between a first participant and a second participant;
       programming, via a control plane, a stream classifier which is to process packets associated with the communication session with classification logic;
       receiving a first packet at the stream classifier, the first packet including a stream ID;
       when the communication session requires recording, applying the classification logic at the stream classifier to route the first packet into a chosen service function path of a plurality of service function paths, wherein the chosen service function path comprises a recording service function;
       identifying a buffer for the recording service function to record the first packet in, comprising:
          locating, using the stream ID as a key, a buffer from a list of active buffers;
          creating, in response to the locating failing to locate a buffer from the list, a new buffer in the list with stream ID as a key of the new buffer;
       recording, the recording service function, the first packet to the identified buffer;
       reporting media quality data from the recording service function in the chosen service function path to the control plane;
       based on the media quality data, updating the classification logic programmed in the stream classifier by the control plane to migrate the communication session to a new chosen service function path to yield updated classification logic;
       receiving subsequent packets at the stream classifier; and
       routing, according to the updated classification logic, to the new chosen service function path.

11. The system of claim 10, wherein the execution of the instructions further cause the processor to perform forming a network service header identifying the chosen service function path and the stream ID associated with the communication session.

12. The system of claim 10, wherein the first packet and subsequent packets are real-time transport protocol packets.

13. The system of claim 10, when the recording service function retrieves a tenant ID that identifies a recording service provider to record the communication session.

14. The system of claim 13, where the tenant ID is retrieved from the control plane via an application programming interface or included in a network service header.

15. The system of claim 10, wherein the processor performs the routing of the first packet to the chosen service function path by routing the first packet with a recording profile that identifies at least one parameter associated with recording the communication session.

16. The system of claim 10, wherein the recording service function retrieves data required to store a recording of the communication session, and wherein the data comprises at least one of a conference ID, a participant ID, a session ID, the stream ID, a date, a time, social media data, external data, content associated with the communication session, security information, policy information associated with retrieving the recording of the communication session, and a document ID for a document associated with the communication session.

17. The system of claim 10, where the media quality data further comprises data received from a service function in the chosen service function path, wherein the service function differs from the recording service function.

18. The system of claim 10, wherein the media quality data comprises media quality statistics for an active recording session associated with recording the communication session.

19. A non-transitory computer-readable storage device storing instructions which, when executed by a processor, cause the processor to perform operations comprising,
in each switch of a plurality of switches in a network fabric:
establishing a communication session between a first participant and a second participant;
programming, via a control plane, a stream classifier which is to process packets associated with the communication session with classification logic;
receiving a first packet at the stream classifier, the first packet including a stream ID;
when the communication session requires recording, applying the classification logic at the stream classifier to route the first packet into a chosen service function path of a plurality of service function paths, wherein the chosen service function path comprises a recording service function;
identifying a buffer for the recording service function to record the first packet in, comprising:
locating, using the stream ID as a key, a buffer from a list of active buffers;
creating, in response to the locating failing to locate a buffer from the list, a new buffer in the list with stream ID as a key of the new buffer;
recording, the recording service function, the first packet to the identified buffer;
reporting media quality data from the recording service function in the chosen service function path to the control plane;
based on the media quality data, updating the classification logic programmed in the stream classifier by the control plane to migrate the communication session to a new chosen service function path to yield updated classification logic;
receiving subsequent packets at the stream classifier; and
routing them, according to the updated classification logic, to the new chosen service function path.

20. The non-transitory computer-readable storage device of claim 19, wherein execution of the instructions further cause the processor to perform forming a network service header identifying the chosen service function path and the stream ID associated with the communication session.

* * * * *